(12) United States Patent
Salmo et al.

(10) Patent No.: US 7,261,316 B1
(45) Date of Patent: Aug. 28, 2007

(54) SIDE CURTAIN AIRBAG ASSEMBLY

(75) Inventors: Shakir M. Salmo, Sterling Heights, MI (US); Richard L. Morgan, Shelby Township, MI (US); Bruce Kalandek, Dearborn, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/615,420

(22) Filed: Dec. 22, 2006

(51) Int. Cl.
 *B60R 21/213* (2006.01)
(52) U.S. Cl. .............................. 280/730.2; 280/728.2
(58) Field of Classification Search ............ 280/730.2, 280/728.2, 743.2; *B60R 21/213*
See application file for complete search history.

(56) References Cited

U.S. PATENT DOCUMENTS

| | | | |
|---|---|---|---|
| 5,865,466 A | 2/1999 | Yamamoto et al. | |
| 5,988,675 A | 11/1999 | Bathon et al. | |
| 6,070,904 A | 6/2000 | Ozaki et al. | |
| 6,126,192 A | 10/2000 | Enders | |
| 6,135,490 A | 10/2000 | Spary | |
| 6,176,515 B1 * | 1/2001 | Wallner et al. | 280/730.2 |
| 6,206,409 B1 | 3/2001 | Kato et al. | |
| 6,299,199 B1 * | 10/2001 | Bowers et al. | 280/730.2 |
| 6,428,037 B1 * | 8/2002 | Bakhsh et al. | 280/729 |
| 6,435,543 B1 * | 8/2002 | Magoteaux et al. | 280/730.2 |
| 6,464,250 B1 * | 10/2002 | Faigle et al. | 280/730.2 |
| 6,471,240 B2 * | 10/2002 | Bakhsh et al. | 280/729 |
| 6,474,678 B1 * | 11/2002 | Boxey | 280/728.2 |
| 6,505,853 B2 * | 1/2003 | Brannon et al. | 280/730.2 |
| 6,517,110 B1 * | 2/2003 | Butters et al. | 280/749 |
| 6,527,296 B2 * | 3/2003 | Bakhsh et al. | 280/730.2 |
| 6,698,792 B2 | 3/2004 | Heath | |
| 6,722,693 B2 | 4/2004 | Ikeda et al. | |
| 6,889,999 B2 | 5/2005 | Dominissini et al. | |
| 2002/0020995 A1 | 2/2002 | Abe et al. | |
| 2002/0089154 A1 | 7/2002 | Ogawa et al. | |
| 2005/0029789 A1 | 2/2005 | Chapman | |

(Continued)

FOREIGN PATENT DOCUMENTS

DE 19838815 3/1999

(Continued)

*Primary Examiner*—Paul N. Dickson
*Assistant Examiner*—Joselynn Y. Sliteris
(74) *Attorney, Agent, or Firm*—Lonnie Drayer

(57) ABSTRACT

An airbag attachment associated with a non-inflatable portion on a side curtain airbag provides loops that are sewn or otherwise attached to the non-inflatable portion of the airbag. The loops directly encircle a gas supply tube and are provided on the non-inflatable portion such that the non-inflatable portion of the airbag can be slipped over the gas supply tube and suspended similar to a shower curtain on a curtain rod. The use of mounting tabs in the region of the non-inflatable portions is eliminated. Additional attachment ties with frangible seams can be used to attach the airbag to the gas supply tube in the location of the non-inflatable portion near the loop such that the airbag can be properly folded and bundled for compact placement within the vehicle body. The loops can be passed through openings in non-inflatable portions of the airbag, each loop directly encircling the gas supply tube. The loops can be provided with an attachment hole to enable the loops to be fastened to the vehicle body similar to a mounting tab. Upon deployment the side curtain airbag will remain suspended from the loops.

18 Claims, 4 Drawing Sheets

U.S. PATENT DOCUMENTS

2005/0082798 A1    4/2005    Tallerico et al.
2005/0218634 A1*  10/2005  Rose et al. .............. 280/730.2
2007/0126214 A1*  6/2007   Quach et al. ............ 280/730.2

FOREIGN PATENT DOCUMENTS

| | | |
|---|---|---|
| DE | 10351679 | 5/2005 |
| JP | 2000-326815 | 11/2000 |
| JP | 2001-158320 | 6/2001 |
| JP | 2002-067851 | 3/2002 |
| JP | 2002-205619 | 7/2002 |
| JP | 2004-155331 | 6/2004 |

* cited by examiner

SIDE CURTAIN AIRBAG ASSEMBLY

BACKGROUND OF THE INVENTION

Field of the Invention

The present invention relates generally to a side curtain airbag assembly for motor vehicles. More specifically the invention relates to an anti-wrap feature for a side curtain airbag.

Side curtain airbags provide cushioning between vehicle occupants and the doors and windows of a vehicle during a lateral impact. Side curtain airbags can extend from a front pillar all the way to the rear of a vehicle and in large mini vans or sport utility vehicles the airbags can cover not only the front and second row seats, but even further back to the additional rear seats in such vehicles. The airbags can extend between any designated set of pillars of the vehicle from the front A pillar, B pillar, C pillar to even the D rear pillar of a vehicle.

Due to the large volume of inflation gas needed to deploy such airbags they are commonly provided with flat or uninflated sections in areas of the airbag where a vehicle occupant will not likely strike his or her head against the side portions of the vehicle during a collision. Such areas are commonly located in the front portion of the vehicle near the A pillar and extend back a distance sufficient that this space does not need to have a gas filled cushion. Similarly in locations between certain seat locations it is not likely that an inflatable section of the airbag is needed. What is needed in these areas instead of a 3-dimensional inflatable region filled with gas is simply one or more layers of material forming the airbag that is not inflated. It is a two-plane configuration that simply unfolds with the rest of the airbag during inflation. The non-inflated portion of the airbag in front of or rearward of the inflatable portions of the airbag is commonly called a sail portion. The sail portion is an efficient way of limiting the amount of gas required to deploy side curtain airbags. To deploy a side curtain airbag an inflator is commonly used at one end or the opposite end of the airbag depending on the size of the vehicle. Alternatively, the inflator can be placed in the middle of a side curtain airbag on a larger vehicle like a minivan such that the inflation gas is sent to a T section and then to gas supply tubes extending in opposing directions such that forward and rearward cushions can be inflated relatively simultaneously. Smaller vehicles commonly have the inflator at the A pillar and the gasses flow from the A pillar location through the fill tube to inflate the side curtain airbags which are configured to provide protection for the vehicle occupants in the front or both front and rear seats.

Typically the gas supply tubes extend inwardly of the airbag and communicate the gas through exhaust ports or holes that can be strategically placed to fill the separate inflatable compartments or the end of the gas supply tube can simply be an outlet port located at a strategic location of the cushion depending on the simplicity or the complexity of the design. These airbags are typically pre-assembled and have attachment tabs with anchoring features such that they can be physically fastened or screwed into the vehicle body in the region of the pillars. The assemblies preferably have the airbag folded such that upon activation certain tear seams are ripped apart. Typically the airbag in the area to be inflated has the gas supply tube inserted through an elongated channel portion of the airbag and upon actuation the gasses inflate and deploy the airbag in a quick manner such that the side curtain can deploy rapidly. A common problem in such airbags is that they must be properly positioned and located so the deployment is uniform and the entire side curtain airbag moves downward towards the area to be protected in a uniform and rapid manner.

For airbags having sails or flat portions, with mounting tabs located near the sail portion the deployment of the airbag can be impaired by a mounting tab.

It is a feature of the present invention to provide a side curtain airbag with said portions that eliminate or greatly reduce the possibility of the side curtain being constricted. It is a further feature that a means is provided to ensure that the airbag always deploys properly and that there are no areas in which the airbag can twist or be prevented from proper deployment.

SUMMARY OF THE INVENTION

The present invention as described provides an airbag means for attachment in the region of a sail portion on a side curtain airbag that provides loops sewn or otherwise attached to the sail portion of the airbag. The loops are designed to encircle a gas supply tube and are provided at the ends of the sail portion such that the sail portion of the airbag can be slipped over the gas supply tube and is suspended in a sliding manner similar to a shower curtain on a curtain rod. The use of mounting tabs in the region of the sail portions is eliminated. In the preferred embodiment additional attachment ties with frangible seams can be used to attach the airbag to the fill tube in the location of the sail portion adjacent the loop such that the airbag can be properly folded and bundled for compact placement within the vehicle body. In another embodiment the loops are passed through openings or slots, flat, uninflated portions in the airbag and also encircle the gas supply tube. The loops can be provided with an attachment hole to enable the loop to be fastened to the vehicle body similar to a mounting tab. Upon deployment the airbag can be suspended from the loops.

DETAILED DESCRIPTION OF THE INVENTION

Figure 1:
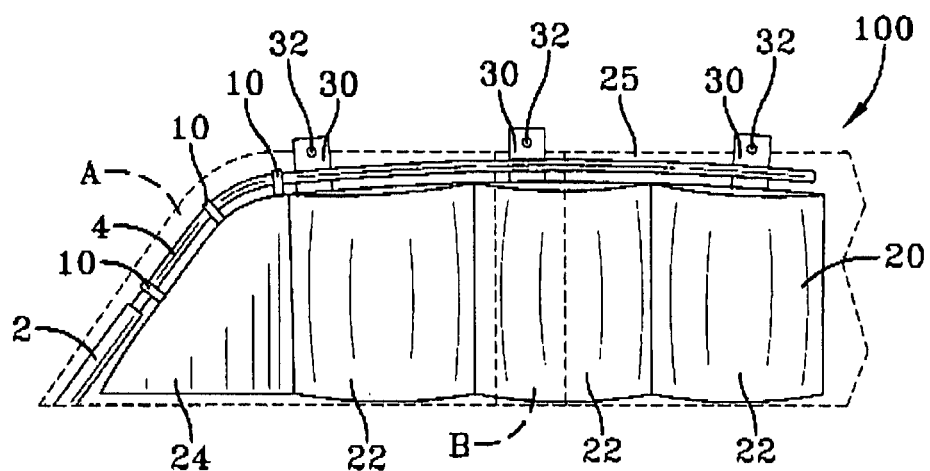
FIG. 1 shows a side curtain airbag in a deployed condition showing the sail portion in an A pillar position.

FIG. 1 shows a side curtain airbag assembly 100 in a deployed condition for a typical passenger vehicle wherein the side curtain airbag 20 has an inflatable cushion portion 22 covering the front side window and extending towards a sail portion 24 near the A pillar of the vehicle. The side curtain airbag assembly 100 is fastened to the vehicle structure by one or more means for attachment including mounting tabs 30 that extend from the top of the side curtain airbag 20. The mounting tabs 30 are typically provided in two or more locations that are bolted or otherwise fastened to the vehicle structure using fasteners inserted through holes 32 in the mounting tabs. The side curtain airbag assembly 100 extends as shown toward the rear portion of the vehicle and has a plurality of inflatable cushion portions 22 that cover the window portions and certain pillars as shown. Each of the cushion portions 22 is filled with inflation gas that exits from the gas supply tube 4 as illustrated. The sail portion 24 as shown has attachment loops 10 sewn or otherwise attached to the sail portion 24 wherein the loops 10 directly encircle the gas supply tube 4 and is suspended therefrom as shown.

Figure 2:
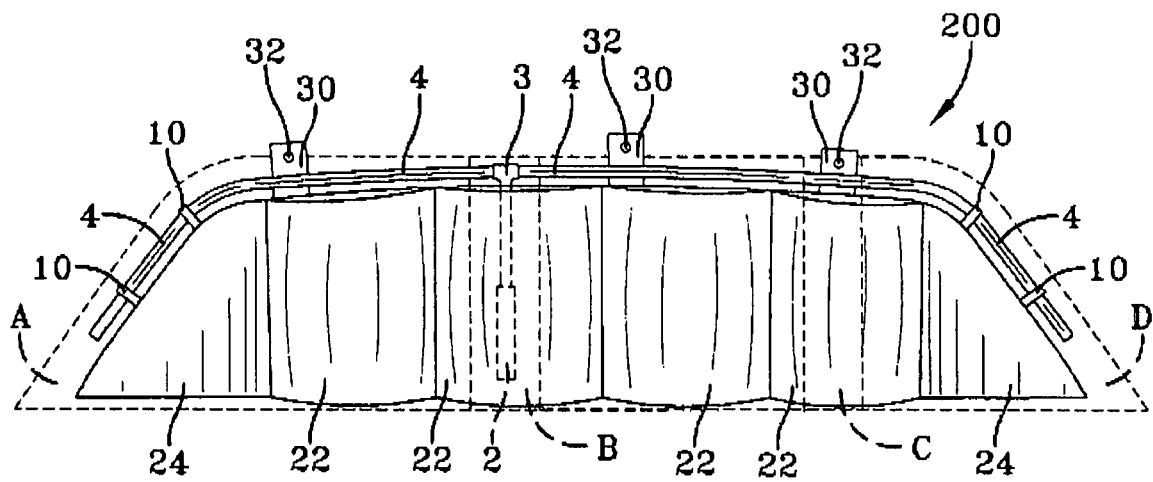
FIG. 2 shows an alternative embodiment of the side curtain airbag.

FIG. 2 shows an alternative embodiment of the side curtain airbag 200 for a larger sized vehicle, either a minivan or a sport utility extending from the A to D pillar position wherein a sail portion is provided in both a front and rear portion of an airbag upon deployment. In such a vehicle the side curtain airbag assembly 200 as shown deployed has the airbag inflator 2 positioned intermediate between the front and rear seat preferably along the B pillar or C pillar. The inflator 2 is connected to a T section 3 that extends to gas supply tubes 4 in both forward and rearward directions. The sail portion 24 near the D pillar may further include additional sail portions 24 in areas not needing inflation or cushioning to protect a vehicle occupant. As shown, one or more means for attachment 30 for connecting the assembly to a vehicle are used to attach the airbag assembly. The means for attachment or tabs 30 are generally referred to as mounting tabs, which are integral or attached to the airbag 200 along an attachment end and can include a fastener inserted through a hole 32 that can be attached or fastened directly to the vehicle body.

Figure 3:
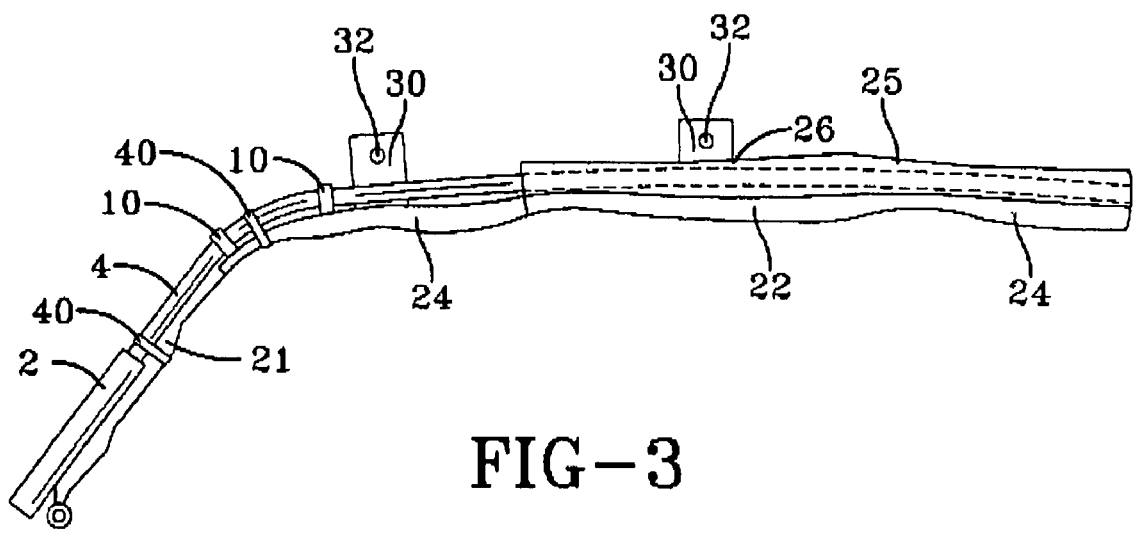
FIG. 3 shows a folded airbag employing loops according to the present invention.
Figure 4:
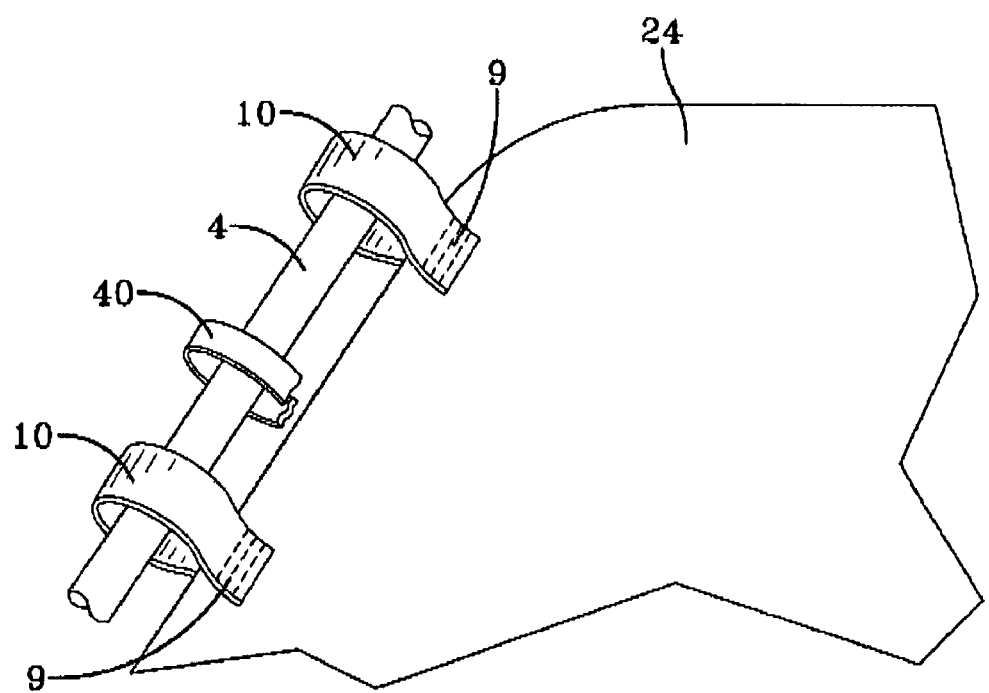
FIG. 4 is an enlarged view of a pair of loops sewn to the airbag.

FIG. 3 shows a folded side curtain airbag employing attachment loops according to the present invention. The present invention provides one or more attachment loops 10 attached to the side curtain airbag 20 directly encircling the gas supply tube 4 from which the side curtain airbag 20 is suspended. The attachment loops 10 preferably are attached to the side curtain airbag 20 in an area where the non-inflatable sail portion 24 is located. FIG. 4 is an enlarged view of a pair of loops 10 sewn to the side curtain airbag in the sail portion location. The loops 10 as shown are preferably made of a strong nylon webbing material that can be sewn or stitched with threads 9 directly to an end of the side curtain airbag 20 such that the side curtain airbag 20 can be suspended from the loop 10 directly encircling the gas supply tube 4 and physically restrained simply by means of the combination of the gas supply tube 4 and the attachment loops 10 in that location. The side curtain airbag assembly 20 at the front A pillar can optionally be anchored to the vehicle body by a tether 21 as shown in FIG. 3, which is physically attached to a sail portion 24 of the side curtain airbag 20 which extends towards an inflator 2 that provides inflation gas for deployment.

With reference to FIG. 3, the attachment loop 10 is shown wherein it directly encircles a gas supply tube 4 such that upon assembly the gas supply tube 4 can simply be slipped through the opening in the loop 10 and the sail portion can be suspended therefrom. The gas supply tube 4 will then extend inward into a channel in the neck of the side curtain airbag 20 and communicates or is open to the cushion portions 22 of the side curtain airbag 20 that are intended to be inflated during deployment. Thereafter the side curtain airbag 20 can be folded and attached to the airbag inflator 2 if not already so attached to the gas supply tube 4 by conventional means. The folded side curtain airbag 20 can be maintained in this folded condition by covering the folded side curtain airbag 20 excluding the sail portion 24 with a breakable cylindrically shaped cover or sleeve 25. Further, a plurality of attachment straps with breakaway means such as separate frangible ties or tape 40 are wrapped and tied or taped about the folded sail portion 24 and folded inflatable cushion portions 22 suspended on the gas supply tube 4. The frangible ties or tape 40 as well as the cover 25 will break upon activation of the side curtain airbag 20 and allow the side curtain airbag 20 to drop and fill in a normal fashion. However, it is important that the attachment loops 10 be employed in order to keep the rather thin sail portion 24 from wrapping, being wrapped or getting twisted about the gas supply tube 4. This is a problem in that the side curtain airbag 20 in the locations of the sail portion 24 can become constricted about the gas supply tube 4 preventing proper deployment of the side curtain airbag 20. The locations of sail portion 24 can either be at the A pillar location or could be intermediate thereof in any position along the side curtain airbag 20. As shown, one or more of the attachment loops 10 will be used to suspend the side curtain airbag 20 in a fashion similar to a shower curtain on a rod wherein the side curtain airbag 20 can actually physically slip along the gas supply tube 4 if so desired. The ties or tape 40 are designed to break with minimal resistance upon activation of the side curtain airbag 20. In one embodiment the frangible ties or tape 40 are made of a lightweight adhesive backed plastic tape.

Figure 5B:
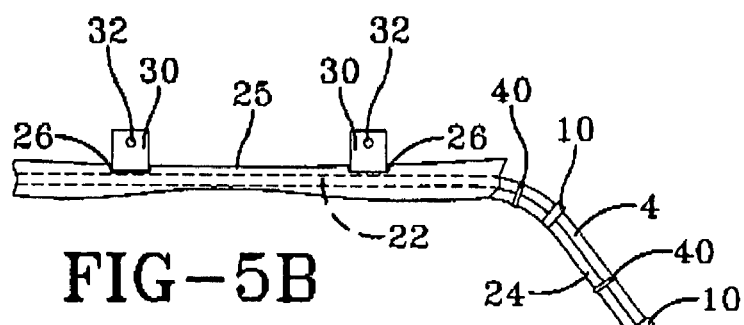
FIG. 5B shows the side curtain airbag of FIG. 5A shown in a folded condition with a frangible sleeve encircling the assembly.
Figure 5A:
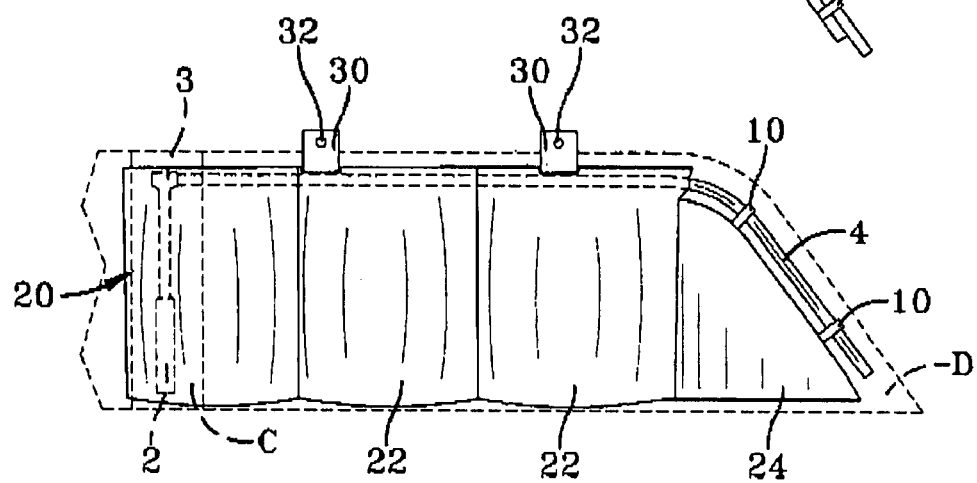
FIG. 5A shows a side curtain airbag suspended between the C and D pillars.

With reference to FIGS. 5A and 5B, another embodiment of the present invention is shown. FIG. 5A shows a side curtain airbag 20 suspended between the C and D pillars having a sail portion 24 attached to a gas supply tube according to the present invention. FIG. 5B shows the side curtain airbag of FIG. 5A in a folded condition with a frangible sleeve encircling the assembly. The side curtain airbag 20 extends between the C and D pillars having the inflatable cushion portions 22 covering the rear side windows and the sail portion 24 being near the D pillar. As shown the inflator is located in the C pillar area and is connected to the gas supply tube 4, which extends through a channel in the side curtain airbag 20 to an end wherein the sail portion 24 is suspended by attachment loops 10 according to the present invention. As shown the side curtain airbag is clamped about the gas supply tube 4 by clamp 27 to seal the side curtain airbag 20 against the gas supply tube 4. The exposed end of the gas supply tube 4 has no passages for the inflation gas to escape. FIG. 5B shows the side curtain airbag 20 folded with mounting tabs 30 extending through slots 26 in the sleeve cover 25.

Figure 6B:
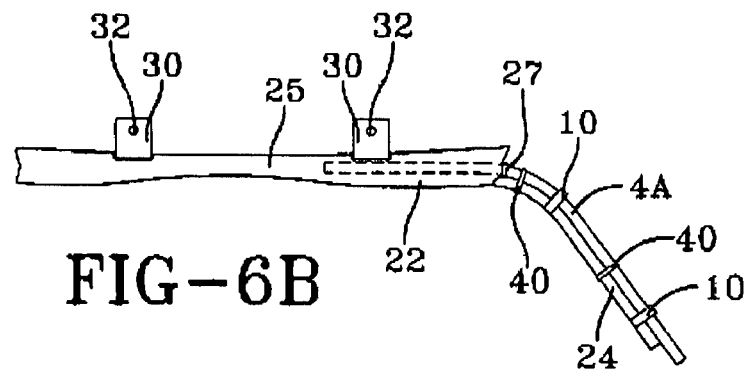
FIG. 6B shows the embodiment of FIG. 6A shown in a folded condition.
Figure 6A:
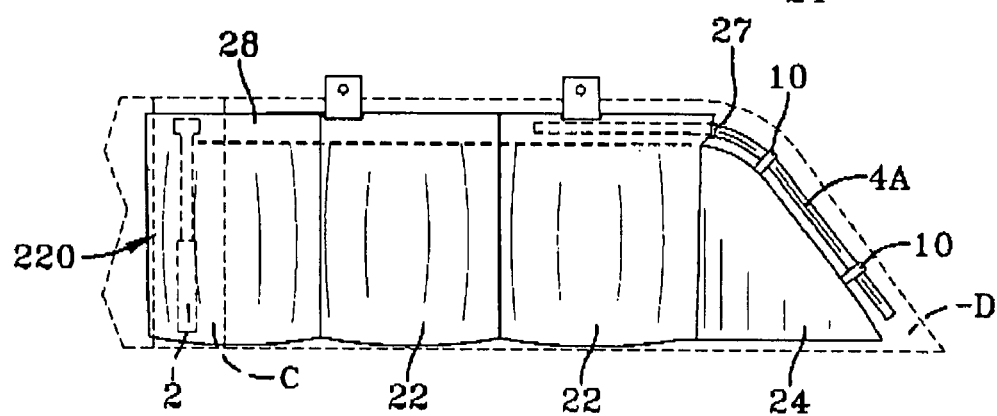
FIG. 6A shows another embodiment side curtain airbag having a short mounting rod affixed to the airbag from which a sail portion can be attached according to the present invention.

FIG. 6A shows another embodiment of a side curtain airbag having a short mounting rod affixed to the side curtain airbag from which a sail portion can be attached according to the present invention. FIG. 6B shows the embodiment of FIG. 6A in a folded condition. The second alternative embodiment side curtain airbag assembly is shown wherein the side curtain airbag 220 has an internal channel into which inflation gasses pass directly from the inflator 2 to connector 3. The channel 28 is formed from the fabric of the side curtain airbag 220. At the end of the channel 28 a tube or rod 4A is inserted in the opening and held by a clamp 27. The sail portion 24 is then looped over the short tube or rod with the attachment loops 10 of the present invention. FIG. 6B shows this assembly in the folded condition with the mounting tabs 30 extending through slots 26 in the sleeve 25. The rod 4A can be a plastic molded component attached to the side curtain airbag 220.

While the attachment loops 10 are shown in the locations of the non-inflatable sail portion 24 it is possible that such loops 10 could be used in other areas of the side curtain airbag 20 such that the entire side curtain airbag 20 could be alternatively suspended upon the gas supply tube 4 if so desired, however, as is commonly recognized a portion of the gas supply tube 4 will extend inward a sleeve or pocket or internal conduit portion of the side curtain airbag 20 so that the gas can be passed from the gas supply tube 4 into the cushion 22 to provide filling of the side curtain airbag 20. In such a case the attachment loops 10 would be required in the regions wherein the fill tube 4 is internally placed in a sleeve 25 or internal conduit or channel portion 28.

Figure 7:
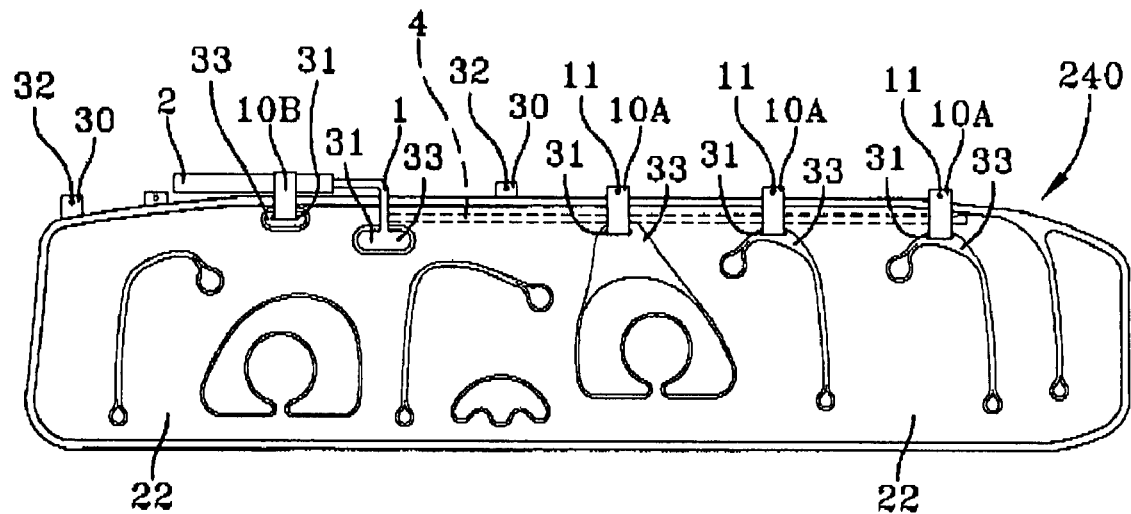
FIG. 7 is a plan view of a second alternative embodiment according to the present invention.

FIG. 7 is a plan view of a second alternative embodiment showing a suspended side curtain airbag 240 attached by attachment loops passing through the side curtain airbag and further having an inflator mid mounted and directly encircled by an attachment loop according to the present invention. In this embodiment a side curtain airbag 240 is illustrated suspended from a gas supply tube 4, which extends across most of the side curtain airbag. The suspended side curtain airbag 240 has a plurality of holes 31 in locations 33 where the side curtain airbag does not normally inflate. The holes provide access slots 31 through which a modified attachment loop 10A can be inserted. The loop 10A can pass through the holes encircling both a portion of the side curtain airbag nearest the fill tube and the fill tube 4 as shown. The attachment loops 10A are distinguished from the attachment loops 10 previously discussed in that the free ends of the loops 10A can be overlaid and a hole 11 formed therethrough wherein a fastener such as a shoulder bolt can be passed through each hole 11 through that location and attached directly to the vehicle converting the attachment loops 10 to attachment loop tabs 10A. The attachment loop tabs 10A provide not only a means of suspending a side curtain airbag similar to a shower curtain, but also provide a means for affixing the side curtain airbag 240 to the vehicle structure. As shown the side curtain airbag 240 has a mid mounted inflator 2 that is connected to the gas supply tube 4 at an L location 1 as shown. The gas filled inflator 2 is attached to the side curtain airbag 240 using an attachment loop 10B. The attachment loop 10B directly encircles the airbag inflator 2 in such fashion that the inflator 2 can suspend the side curtain airbag 240 similar to that of the attachment loop 10 used around the end of a gas supply tube 4. As shown at the end location near the inflator 2 are two more conventional mounting tabs 30 with access holes 32 through which fasteners can be inserted. This embodiment enables the entire side curtain airbag 240 to be suspended by the loops 10A, 10B and conventional mounting tabs 30. The loops 10A provide not only a suspension of the side curtain airbag 240 but also a means for attachment to the vehicle.

Figure 8:
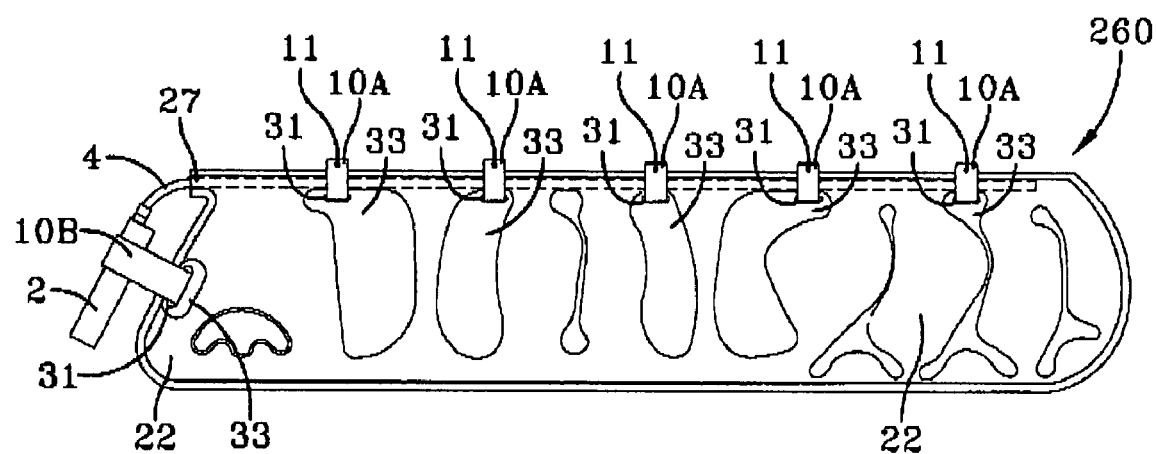
FIG. 8 is a plan view of a third alternative embodiment of the present invention similar to that of FIG. 7 but with an end mounted inflator.

FIG. 8 is a plan view of a third alternative embodiment of the present invention similar to that of FIG. 7 but with an end mounted inflator. The side curtain airbag 260 has similar holes 31 in areas or locations 33 of the side curtain airbag 240 that are not normally inflated. The holes or slots 31 provide access such that an attachment loop 10A can be inserted therethrough directly encircling the gas supply tube 4 as previously discussed and then a hole 11 provided therethrough for mounting to the vehicle. As shown the inflator 2 is located in an end of the side curtain airbag and on that side of the side curtain airbag is an attachment loop 10B as previously discussed directly encircling the inflator 2. Each of the embodiments illustrated in FIGS. 7 and 8 can then be foled and then taped as previously discussed using the ties or tape 40 as previously shown in the other embodiments. As shown each of these embodiments provides a unique way of suspending a side curtain airbag similar to a shower curtain such that the side curtain airbag is capable of sliding along the gas supply tube and being suspended therefrom.

The combination of loops 10 for directly encircling a gas supply tube along a sail portion of a side curtain airbag can be used in combination with the other attachment loops 10A, 10B in such a fashion that the entire side curtain airbag can be suspended using such loops in any combination thereof.

The present invention provides for the installation in a vehicle of a side curtain airbag assembly by using conventional mounting tabs that can be fashioned to at least one or both ends of the side curtain airbag assembly to provide a secure attachment to the vehicle frame which can be complemented by the loops 10, 10A or 10B which can be provided in between these attachment locations to ensure that the side curtain airbag does not get wrapped or twisted about the gas supply tube 4. The loops 10 preferably are positioned in locations where the side curtain airbag is actually external of the gas supply tube 4 or loops 10B around an externally positioned inflator. In either case the addition of these loops provides a beneficial anti-wrap feature that prevents the side curtain airbag from being inadvertently twisted about the gas supply tube 4 upon assembly to the vehicle. As used herein anti-wrap means avoiding any portion of the side curtain airbag becoming twisted around a fill tube upon assembly so as to constrict proper depolymer. This greatly benefits and simplifies the assembly operation when the side curtain airbags are physically attached to the vehicle and prevents unwanted constrictions to occur to impede a proper side curtain airbag deployment.

The invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

We Claim:

1. A side curtain airbag assembly comprising:
   a side curtain airbag having inflatable portions and at least one non-inflatable portion located to a side of the inflatable portions;
   an airbag inflator;
   an elongated gas supply tube connected to the inflator and inserted into a portion of the side curtain airbag to provide a means to inflate the side curtain airbag upon inflation;
   one or more means for attachment fixing the side curtain airbag assembly to a vehicle; and
   one or more loops attached to the side curtain airbag directly encircling the gas supply tube from which the side curtain airbag is suspended.

2. The side cushion airbag assembly of claim 1 wherein the non-inflatable portion has one or more of the loops attached to the material forming the non-inflatable portion and is held externally from the gas supply tube by the loops.

3. The side curtain airbag assembly of claim 2 wherein one of the non-inflatable portions is at an end of the side curtain airbag when assembled in a vehicle near an A pillar.

4. The side curtain airbag assembly of claim 3 wherein the inflator and a portion of the gas supply tube external of the side curtain airbag are configured to be placed in a vehicle or located in or near the A pillar.

5. The side curtain airbag assembly of claim 1 further comprising a plurality of attachment straps or tapes with breakaway or release means for securing, tying or taping the side curtain airbag to the gas supply tube.

6. The side curtain airbag assembly of claim 1 wherein the loops have a strength sufficient to attach the side curtain airbag onto the gas supply tube.

7. The side curtain airbag assembly of claim 1 wherein the one or more loops has the gas supply tube inserted therethrough to suspend the side curtain airbag from the gas supply tube.

8. The side curtain airbag assembly of claim 1 wherein the loops are sewn or otherwise attached to a non-inflatable portion of the side curtain airbag and the loops are slipped over the gas supply tube suspending the non-inflatable portion from the gas supply tube.

9. The side curtain airbag assembly of claim 1 wherein the inflator is connected to a gas supply tube having a T section and extending from the T section into two gas supply tube portions, one forward portion and one rear portion for filling one or more inflatable portions of the side curtain airbag, and wherein one or more non-inflatable portions are suspended externally of the gas supply tube.

10. The side curtain airbag assembly of claim 1 wherein the one or more means for attachment include tabs bolted or otherwise fastened to a vehicle upon assembly.

11. The side curtain airbag assembly of claim 1 further comprising a breakable cylindrically shaped cover for maintaining the folded side curtain airbag excluding the non-inflatable portion.

12. A side curtain airbag assembly comprising:
a side curtain airbag having inflatable portions and non-inflatable portions;
an airbag inflator;
an elongated gas supply tube connected to the inflator and inserted into a portion of the side curtain airbag to provide a means to inflate the side curtain airbag upon inflation;
one or more means for attaching fixing the side curtain airbag assembly to a vehicle; and
one or more loops attached to a non-inflatable portion of the side curtain airbag directly encircling the gas supply tube or an inflator from which the side curtain airbag is suspended.

13. The side cushion airbag assembly of claim 12 wherein each of the non-inflatable portions has one or more of the loops attached thereto and is held suspended on the gas supply tube by the loops.

14. The side curtain airbag assembly of claim 12 further comprising a plurality of attachment straps or tapes with breakaway or release means for securing, tying or taping the side curtain airbag to the gas supply tube.

15. The side curtain airbag assembly of claim 12 wherein the loops have a strength sufficient to attach the side curtain airbag onto the gas supply tube.

16. The side curtain airbag assembly of claim 12 wherein the one or more loops has the gas supply tube inserted therethrough to suspend the side curtain airbag from the gas supply tube locally at locations of the one or more loops.

17. The side curtain airbag assembly of claim 12 wherein the loops are attached through a slot or opening in a non-inflatable portion of the side curtain airbag and the loops are slipped over the gas supply tube for suspending the side curtain airbag from the gas supply tube.

18. The side curtain airbag assembly of claim 17 wherein each loop can be flattened and has a hole passing through the flattened loop for attaching the loop to a vehicle using a fastener.

* * * * *